US009317262B2

(12) United States Patent
Dawson et al.

(10) Patent No.: US 9,317,262 B2
(45) Date of Patent: Apr. 19, 2016

(54) IDENTIFICATION OF CODE SYNCHRONIZATION POINTS (71) Applicant: International Business Machines Corporation, Armonk, NY (US)

(72) Inventors: Michael H. Dawson, Ottawa (CA); Trent A. Gray-Donald, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/452,634

(22) Filed: Aug. 6, 2014

(65) Prior Publication Data
US 2015/0121352 A1 Apr. 30, 2015

(30) Foreign Application Priority Data

Oct. 24, 2013 (CA) .................................. 2831134

(51) Int. Cl.
*G06F 9/45* (2006.01)
*G06F 9/44* (2006.01)
(52) U.S. Cl.
CPC ..... *G06F 8/41* (2013.01); *G06F 8/70* (2013.01)
(58) Field of Classification Search
None
See application file for complete search history.

(56) References Cited

U.S. PATENT DOCUMENTS

| | | | | |
|---|---|---|---|---|
| 6,151,688 A * | 11/2000 | Wipfel | ................. | G06F 11/008 709/224 |
| 6,185,601 B1 * | 2/2001 | Wolff | ............... | G06F 17/30067 707/E17.005 |
| 6,411,983 B1 * | 6/2002 | Gallop | ..................... | G06F 9/52 718/104 |
| 7,093,230 B2 * | 8/2006 | E | ........................ | G06F 17/30362 707/E17.007 |
| 7,159,220 B2 * | 1/2007 | Buch | ........................ | G06F 9/52 718/104 |
| 7,512,950 B1 * | 3/2009 | Marejka | .................... | G06F 9/52 718/102 |
| 7,797,585 B1 * | 9/2010 | Sahin | .................. | G06F 11/3409 714/45 |
| 8,069,445 B2 * | 11/2011 | Ma | ...................... | G06F 11/0715 178/1 |
| 2007/0271450 A1 * | 11/2007 | Doshi | ..................... | G06F 9/526 712/245 |

(Continued)

OTHER PUBLICATIONS

Roberson et al; A static analysis for automatic detection of atomicity violations in java programs.

*Primary Examiner* — Qing Chen
*Assistant Examiner* — Hossain Morshed
(74) *Attorney, Agent, or Firm* — Garg Law Firm, PLLC; Rakesh Garg; Joseph Petrokaitis (57) ABSTRACT

An illustrative embodiment of a computer-implemented method for identification of code synchronization points collects locking data for a set of locks in a managed runtime environment associated with the processor to form a set of contended metrics and analyzes the set of contended metrics using a set of predetermined event triggers. The method further determines whether a threshold in a set of predetermined thresholds in the set of predetermined event triggers is met and identifies a particular form of call path capture for a lock associated with the predetermined event trigger identified as having met the predetermined threshold. Call path information for the lock is captured using the particular form of call path capture.

21 Claims, 7 Drawing Sheets

(56) References Cited

U.S. PATENT DOCUMENTS

| | | | | |
|---|---|---|---|---|
| 2009/0089769 A1* | 4/2009 | Grcevski | G06F 8/458 | 717/151 |
| 2009/0319996 A1* | 12/2009 | Shafi | G06F 8/314 | 717/125 |
| 2010/0005467 A1* | 1/2010 | Shpeisman | G06F 9/52 | 718/100 |
| 2010/0186013 A1* | 7/2010 | Harrop | G06F 9/524 | 718/100 |
| 2010/0229160 A1* | 9/2010 | Ishizaki | G06F 8/458 | 717/136 |
| 2011/0202907 A1* | 8/2011 | Dice | G06F 9/45516 | 717/148 |
| 2012/0030657 A1* | 2/2012 | Gao | G06F 9/524 | 717/128 |
| 2012/0143795 A1* | 6/2012 | Han | G06F 11/079 | 706/12 |
| 2012/0174082 A1* | 7/2012 | Dolby | G06F 8/72 | 717/151 |
| 2012/0198460 A1* | 8/2012 | Luo | G06F 9/524 | 718/102 |
| 2012/0311307 A1* | 12/2012 | Chynoweth | G06F 9/30054 | 712/234 |
| 2013/0086348 A1* | 4/2013 | Marathe | G06F 9/467 | 711/163 |
| 2015/0121352 A1* | 4/2015 | Dawson | G06F 8/70 | 717/154 |

* cited by examiner

IDENTIFICATION OF CODE SYNCHRONIZATION POINTS

BACKGROUND

1. Technical Field

This disclosure relates generally to code synchronization in a data processing system and more specifically to efficient identification of code synchronization points in a managed runtime environment of the data processing system.

2. Description of the Related Art

Applications running on a Java® virtual machine (JVM) use locking mechanisms in the form of object locks or java.util.Concurrent locks to manage synchronization between threads. Synchronization however can cause performance issues and prevent applications from scaling when moved to or operated on larger multi-core processing systems. Techniques exist to help developers identify which locks are highly contended, referred to as hot, however the techniques typically have drawbacks.

Drawbacks typically comprise a lack of information as to where in application code the particular locks are held. Further overhead of capturing call path information affects behavior of the application to an unacceptable degree. In gathering information the techniques sample call paths related to all locks regardless of whether the locks a viewed as being hot and therefore typically capture less information about locks, which matter. Sampling further is performed for all threads/call paths because the techniques have no knowledge of which threads/call paths might include locking.

For example, synchronizing on an object with a unique class as opposed to a java.lang.Object can help improve the data collected by these existing techniques. However, this form of synchronizing requires an application to be designed in a particular manner and will not provide information about which code paths are highly contending on a specific lock. For example, there may be 10 locations at which the lock may be held, but only 2 of those locations are called frequently.

SUMMARY

According to one embodiment, a computer-implemented method for identification of code synchronization points comprises collecting, by a processor, locking data for a set of locks in a managed runtime environment associated with the processor to form a set of contended metrics and analyzing the set of contended metrics, by the processor, using a set of predetermined event triggers. The method further determines, by the processor, whether a threshold in a set of predetermined thresholds in the set of predetermined event triggers is met and identifies, by the processor, a particular form of call path capture for a lock associated with the predetermined event trigger identified as having met the predetermined threshold. The method further captures call path information for the lock using the particular form of call path capture.

According to another embodiment, a computer program product for identification of code synchronization points comprises a computer recordable-type device containing computer executable program code stored thereon. The computer executable program code comprises computer executable program code for collecting, by a processor, locking data for a set of locks in a managed runtime environment associated with the processor to form a set of contended metrics; computer executable program code for analyzing the set of contended metrics, by the processor, using a set of predetermined event triggers; computer executable program code for determining, by the processor, whether a threshold in a set of predetermined thresholds in the set of predetermined event triggers is met; computer executable program code for identifying, by the processor, a particular form of call path capture for a lock associated with the predetermined event trigger identified as having met the predetermined threshold; and computer executable program code for capturing call path information for the lock using the particular form of call path capture.

According to another embodiment, an apparatus for identification of code synchronization points comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to collect locking data for a set of locks in a managed runtime environment associated with the processor to form a set of contended metrics; analyze the set of contended metrics using a set of predetermined event triggers; determine whether a threshold in a set of predetermined thresholds in the set of predetermined event triggers is met; identify a particular form of call path capture for a lock associated with the predetermined event trigger identified as having met the predetermined threshold; and capture call path information for the lock using the particular form of call path capture.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
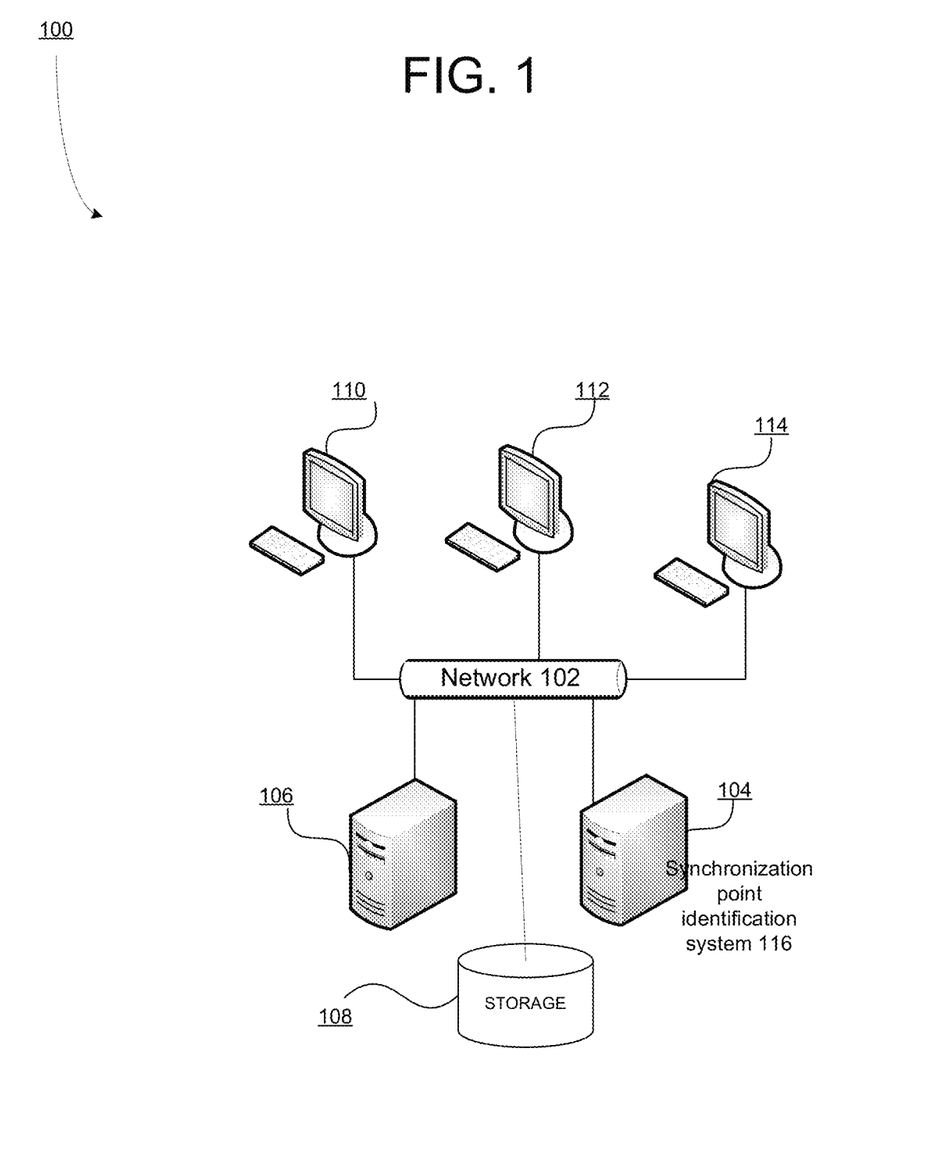
FIG. 1 is a block diagram of an exemplary network data processing system operable for various embodiments of the disclosure.
Figure 2:
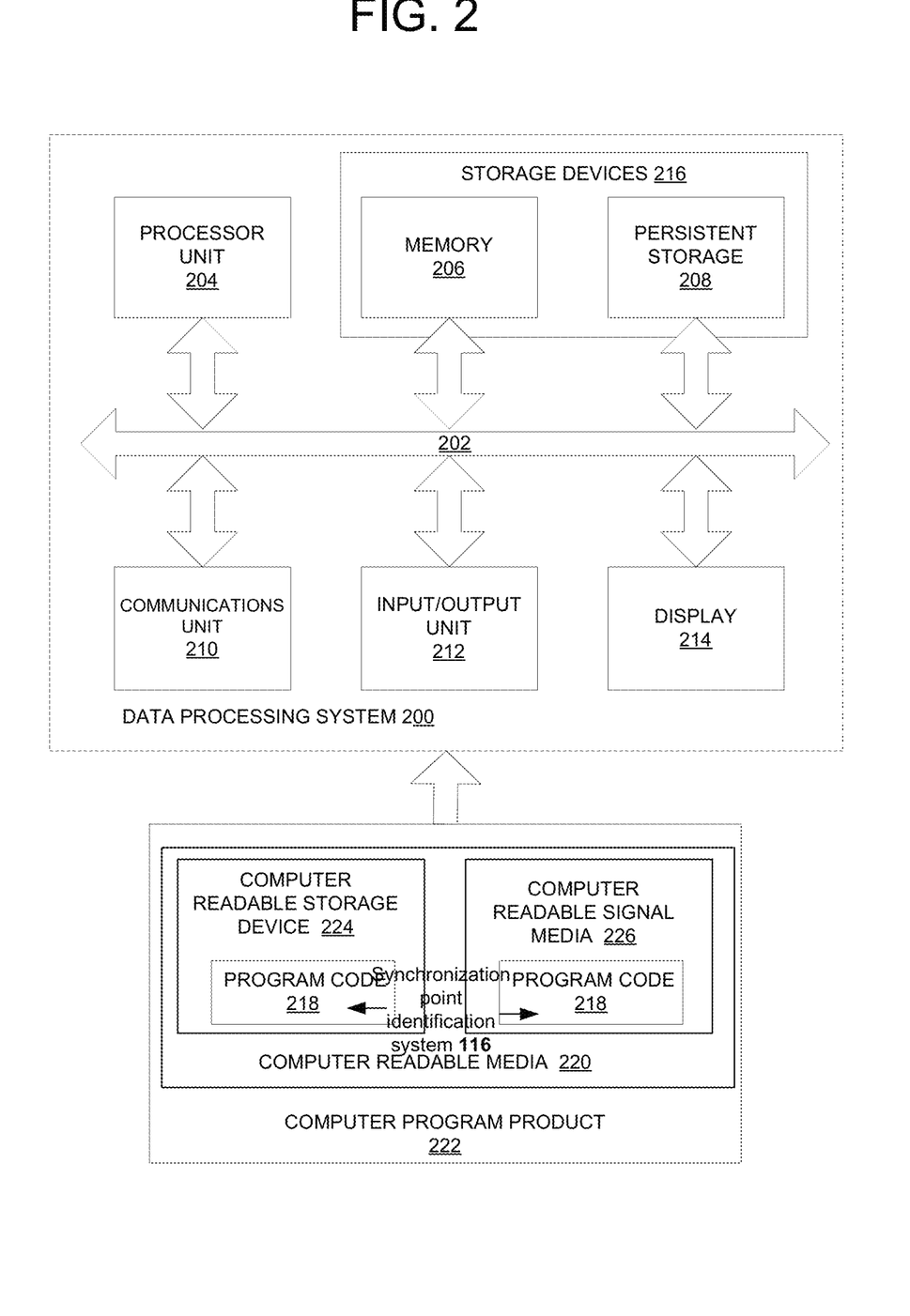
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, synchronization point identification system 116 and applications to clients 110, 112, and 114. Clients 110, 112, and 114 are clients to server 104 in this example. Network data processing system 100 may include additional servers, clients, and other devices not shown. Synchronization point identification system 116 is an embodiment of a method using a number of techniques to selectively capture call path information associated with code synchronization points for hot locks.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, synchronization point identification system 116 of FIG. 1, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable media 220 that in one form is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media or a computer readable data storage device 224. In some instances, computer readable media 220 may not be removable.

Alternatively, program code 218, in this example containing a representation of synchronization point identification system 116 of FIG. 1, may be transferred to data processing system 200 from computer readable media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The propagation form of computer readable media 220 is referred to as computer readable signal media 226. The data processing system providing program code 218 may be a server computer, a client computer, or some other device capable of storing and transmitting program code 218.

Using data processing system 200 of FIG. 2 as an example, a computer-implemented process for identification of code synchronization points is presented. Processor unit 204 collects locking data for a set of locks in a managed runtime environment associated with the processor to form a set of contended metrics and analyzes the set of contended metrics, by the processor, using a set of predetermined event triggers. Processor unit 204 determines whether a threshold in a set of predetermined thresholds in the set of predetermined event triggers is met and identifies a particular form of call path capture for a lock associated with the predetermined event trigger identified as having met the predetermined threshold. Processor unit 204 captures call path information for the lock using the particular form of call path capture.

Tools are available to readily capture a Java stack trace and hence a respective location in application code each time a lock is acquired. Although the capture of data could provide information needed to identify code synchronization points for hot locks, the overhead of generating and capturing the stack traces would typically severely affect the performance of the associated application. The affect would likely be to a point where the behavior of the application was distorted so much the data would no longer be representative of a useful run. The overhead would accordingly prohibit capture of data while the application was running in production or any situation where performance of the application could not be degraded by more than 5-10%.

Similarly capturing all call thread/calls paths within the JVM on a sampling basis would enable identification of the call thread/calls paths which are most frequent and enable mapping to the hottest locks as reported by the JVM. While this would provide the information needed to identify the code synchronization points for hot locks, the overhead of generating and capturing the call thread/call paths, even on a sampling basis, is known to severely affect the performance of the application, likely to a point were the behavior of the application was distorted so much the data would no longer be representative of a useful run. The overhead would also prohibit the capture of data while the application was running in production or any situation where the performance of the application cannot be degraded by more than 5-10%.

For example, JPROF (available from http://perfinsp.sourceforge.net/jprof.html) is a Java profiling agent used with events of a JVM tool interface (JVMTI) or a JVM profiler interface (JVMPI). JPROF captures some of the call path information. Documentation for the tool clearly highlights the negative effect the tool can have on application performance including, unexpected changes in an application. For example, because the instrumentation causes an increase path length a change in cache behavior may occur, wait times may increase, and behavior of background tasks may be altered.

An embodiment of the disclosed method uses a number of techniques to selectively capture call path information associated with code synchronization points for hot locks. The techniques as described in the embodiments enable a reduction in overhead for data capture to a more acceptable level in general and when needed to be able to forgo some data in order to reduce the overhead further. In addition, an embodiment of the disclosed method limits data captured to that for the hot locks thereby keeping data that must be collected to an acceptable level relative to performance. The collected information, using the embodiment of the method, identifies specific call paths contributing to a lock being hot and limits the data collected to hot locks thereby maintaining the data collected at a manageable volume. An embodiment of the disclosed method also removes the overhead of data capture from a most critical path in the application.

In one embodiment a computer-implemented process for identification of code synchronization points for hot locks within a virtual machine, comprises a step of enhancing a virtual machine to collect data as locks are acquired/released to identify which lock or locks is hot. The data collected comprises data including a number of threads that tried and waited to acquire a lock because the lock was held by another thread; a percentage of total time a lock was held, wherein the collected data is referred to as contended thread metrics and is collected for one or more object monitors; locks used within a virtual machine and java.util.concurrent locking constructs, and wherein the virtual machine is a Java virtual machine.

The computer-implemented process further comprises instrumenting event triggers to set thresholds using the contended thread metrics such that when a threshold is reached collection of call path information for a particular lock is initiated. Initiation of collection enables capturing call path information when appropriate to report unique call paths observed as well a relative frequency of the unique call path, wherein capturing the call path information includes only capturing the call path once the lock as been released whereby capture of the call path information does not delay other threads from acquiring the lock, and collecting the call path information on a sampling basis and collecting the call path information each time a new threshold is reached in the contended thread metrics.

Figure 3:
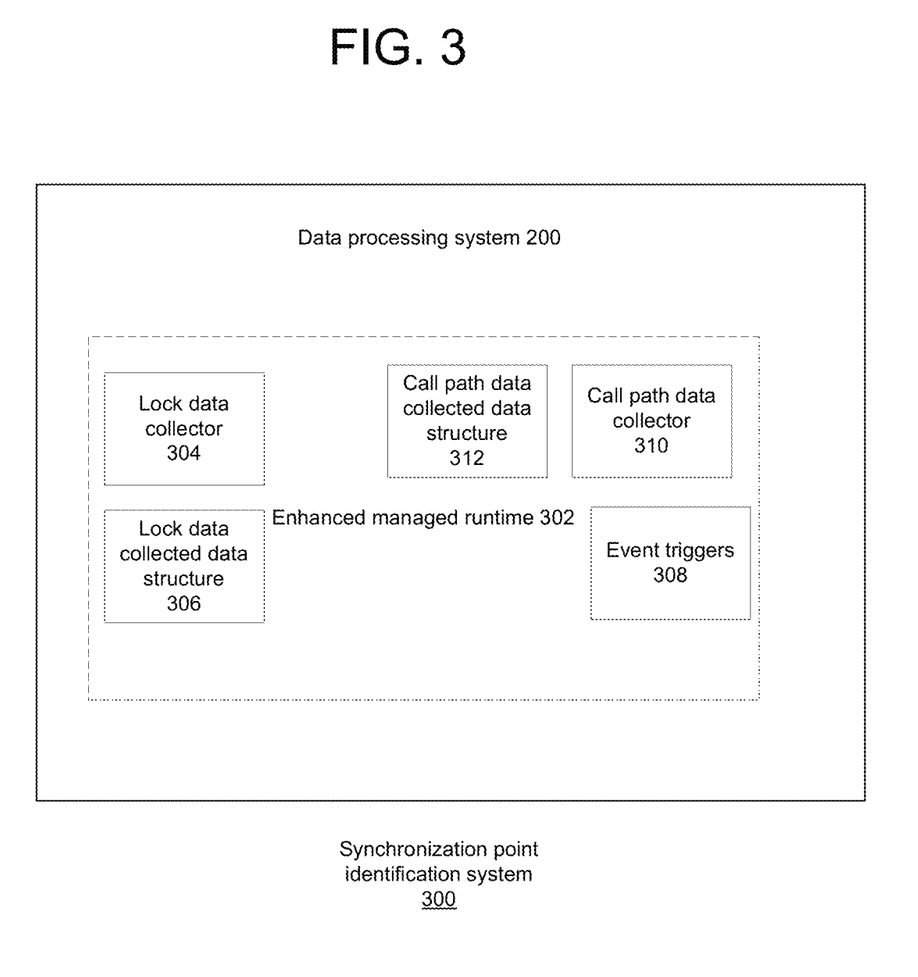
FIG. 3 is a block diagram of a synchronization point identification system operable for various embodiments of the disclosure.

With reference to FIG. 3 a block diagram of a synchronization point identification system operable for various embodiments of the disclosure is presented. Synchronization point identification system 300 comprises a number of components, which collectively enable selective collection of call path information used for identification of synchronization points in an application. The components leverage support of an underlying data processing system such as server 104 of network data processing 100 of FIG. 1 or data processing system 200 of FIG. 2.

The components of synchronization point identification system 300 comprise a number of components including enhanced managed runtime 302, in the current example a Java virtual machine. However embodiments of the disclosed method need not be limited to an implementation of the example and may be readily used in other environments as well. Enhanced managed runtime 302 in the current example is an enhanced virtual machine with a capability to collect data, as locks are acquired/released. An embodiment of synchronization point identification system 300 as disclosed accordingly provides a capability for identification of code synchronization points particularly for hot locks within a virtual machine.

Lock data collector 304 provides a capability of the enhanced virtual machine to collect data, as locks are acquired/released to identify, which locks are "hot", including a number of threads that tried and waited to acquire a lock because the lock was held by another thread, and a percentage of total time a lock is held. The collected data is referred to as contended thread metrics and is saved in lock data collected data structure 306. Data is collected for one or more of object monitors, locks used within the virtual machine and java.util.concurrent (in particular when a JVM is used) locking constructs.

Lock data collector 304, in conjunction with other components of enhanced managed runtime 302, provide efficient improvements for collecting contention information, in the current example for Java locks. The disclosed method is based upon existing technology for lock performance monitoring, and provides enhancements in the form of a mechanism to reduce the impact of the performance monitoring on application performance.

Lock data collector 304 comprises previous techniques, which exist for collecting locking information efficiently such that a collection can be enabled by default, for example, in a JVM. For example augmenting data being collected using monitors including a % miss expressed as 100*SLOW/gets, a number of gets representative of non-recursive lock entries, slow representative of a number of gets which go to an operating system to wait, a % slow representing a percentage of time a thread goes to the operating system to wait, a hold-time representing an average time a lock is held, and a % utilization expressed as 100*Hold-time/Total-time. Lock data collector 304 collects data such that only contended cases (for example, a get reported is always contended) are counted and sampling is used so that we only capture data on a sampling basis.

Event triggers 308 provides a capability, when instrumented according to the disclosed method, to set thresholds using the contended thread metrics such that when a threshold is reached collection of call path information for a particular lock is initiated. The instrumentation of the event triggers therefore provides a selective and dynamic control of when and what to collect with respect to executing threads call paths and associated locks. Event triggers 308 enable thresholds to be set using the contended thread metrics of data in lock data collected data structure 306 such that when a particular threshold, or combination of thresholds, is reached call path data collector 310 is initiated to selectively collect call path information for that particular lock.

Event triggers 308 introduce triggers such that when a predetermined threshold is hit collecting of call path information is initiated for a lock. The disclosed method enables a predetermined threshold to be set for identified metrics of gets, slow, % slow, and others as needed which when hit triggers the collection of call path information. By using the defined triggers only data for locks that are hot by some measure is collected. Selective initiation of collection and selective collection of data limits the overhead of capturing call path data as well as a quantity of the data, which is collected.

Call path data collector 310 provides a capability of capturing call path information when appropriate, in response to control by event triggers 308 to report unique call paths observed as well a relative frequency of the unique call path. Capturing the call path information includes only capturing the call path once a lock has been released so that capture of the call path information does not delay other threads from acquiring the lock, collecting the call path information on a sampling basis and collecting the call path information each time a new threshold is reached in the contended thread metrics.

Call path data collector 310 provides a capability to efficiently capture call path data. Call path data collected data structure 312 stores call path information captured by call path data collector 310. Capturing call path information when appropriate enables reporting of unique call paths observed as well a relative frequency of such call paths. Call path data collector 310 includes techniques to reduce the overhead of capturing call path information including only capturing the call path once a lock has been released so that capture of the call path information does not delay other threads from acquiring the lock, collecting the call path information using a sampling technique and collecting the call path information each time a new threshold is reached in the contended thread metrics.

Figure 4:
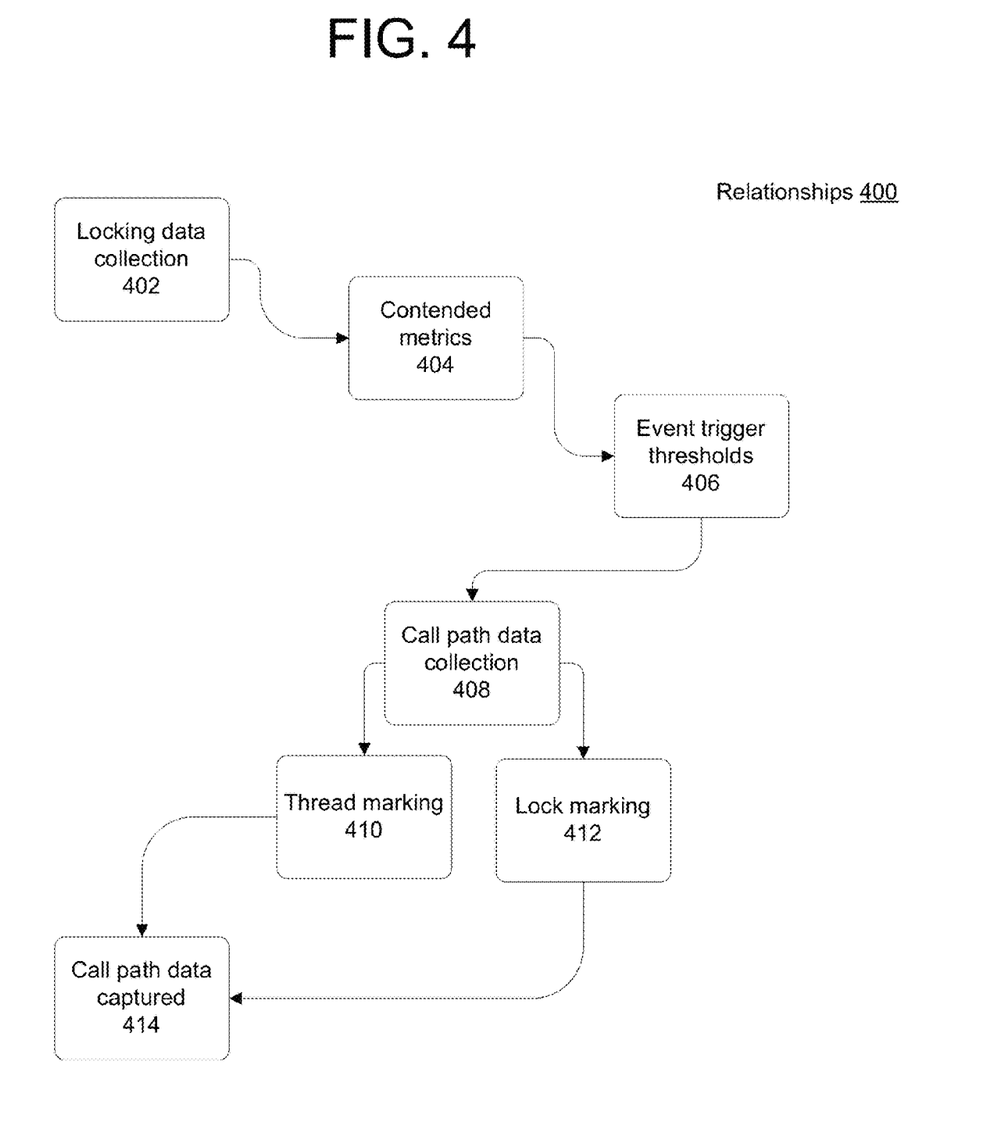
FIG. 4 is a block diagram of a synchronization point identification system of FIG. 3 operable for various embodiments of the disclosure.

With reference to FIG. 4 a block diagram of a synchronization point identification system of FIG. 3 operable for various embodiments of the disclosure is presented. Relationship 400 is an example of component relationships and data flow within synchronization point identification system 300 of FIG. 3.

Relationships 400 provide a view of the interactive relationships among the components of an illustrative embodiment of synchronization point identification system 300 of FIG. 3. Locking data collection 402 performs a collection operation to gather predetermined information associated with locks and locking activity for a particular application or set of applications. A subset of information collected forms contended metrics 404. The data collected, as locks are acquired/released to identify, which locks are hot, including a number of threads that tried and waited to acquire a lock because the lock was held by another thread, and a percentage of total time a lock is held comprises information of interest and referred to as contended metrics because the lock for which information is acquired is under contention.

An analysis of contended metrics 404 in view of event trigger thresholds 406 determines whether to initiate call path data collection 408 for one or more locks. In response to a determination to initiate call path data collection a technique of one of a thread marking 410 and a lock marking 412 is performed. Each of thread marking 410 and lock marking 412 generate call path data in the form of call path data capture 414, which is stored for subsequent analysis and use.

Figure 5:
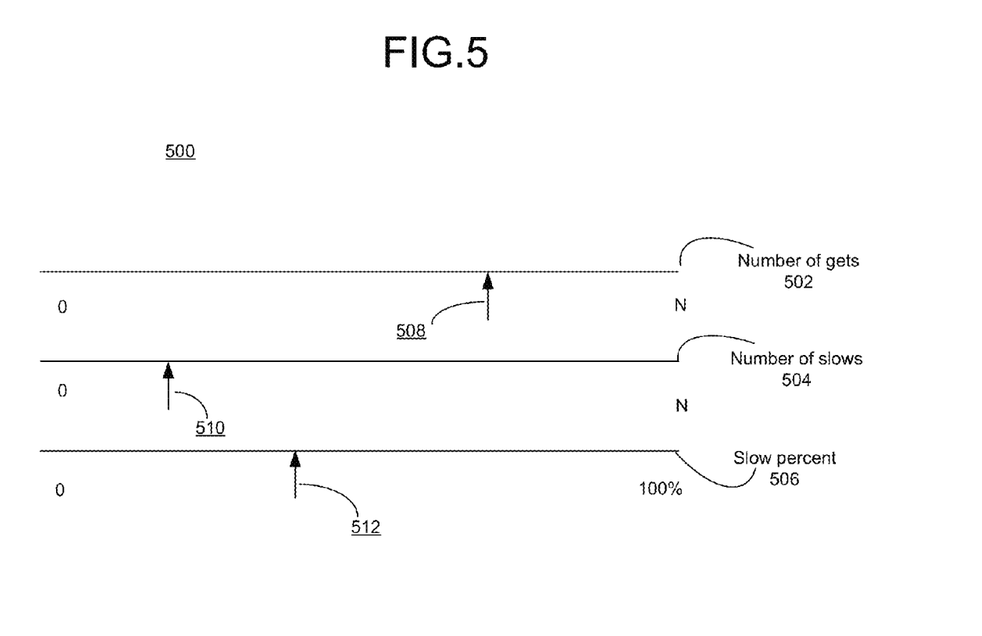
FIG. 5 is a schematic diagram of threshold configuration in the synchronization point identification system of FIG. 3 operable for various embodiments of the disclosure.

With reference to FIG. 5 a schematic diagram of threshold configuration in the synchronization point identification system of FIG. 3 operable for various embodiments of the disclosure is presented. Threshold configuration 500 provides a mechanism to specify metric criteria used to control activation of call path information data collection.

In the example of configuration 500 three possible criteria are number of gets 502, number of slows 504 and slow percent 506 are presented. Other criteria associated with lock metrics may be used rather the examples provided. Number of gets 502 is representative of non-recursive lock entries, number of slows 504 is representative of a number of gets which go to an operating system to wait, and slow percent 506, is representative of a percentage of time a thread goes to the operating system to wait.

A vertical arrow associated with a respective scale indicates a threshold. Threshold 508 represents a particular value of a number of gets in a range from 0 to N. When represented to a user using a graphical interface, threshold 508 could be manipulated in a sliding manner to increase or decrease the value of the threshold. Threshold 510 represents a particular value of a number of slows in a range from 0 to N and is manipulated in a manner similar to that of threshold 508. Threshold 512 represents a particular value of a slow percentage in a range from 0 to 100%.

Fewer or more criteria and associated thresholds may be used to control activation of data collection for the locks as desired by an implementation.

Figure 6:
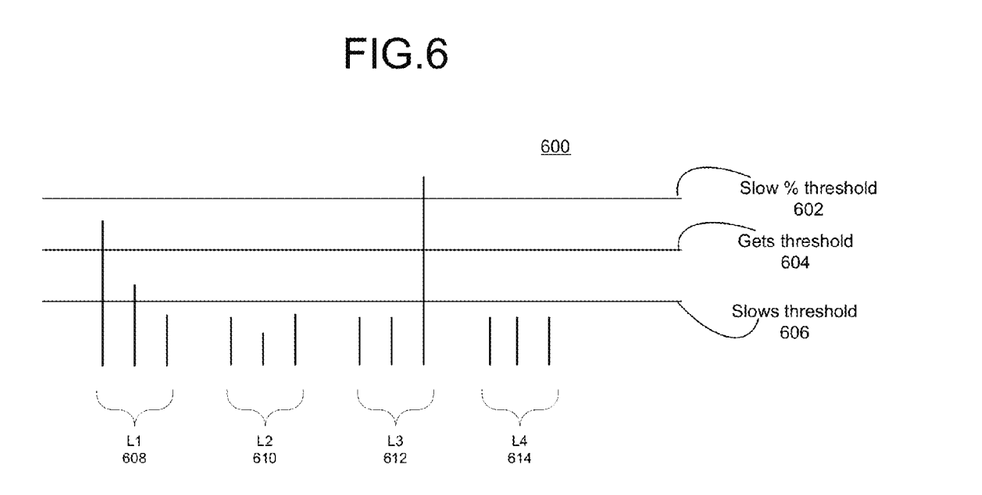
FIG. 6 is a schematic diagram a threshold configuration in the synchronization point identification system of FIG. 5 operable for various embodiments of the disclosure.

With reference to FIG. 6 a schematic diagram a threshold configuration in the synchronization point identification system of FIG. 5 operable for various embodiments of the disclosure is presented. Threshold configuration 600 provides an example using a plurality of locks with specific metric criteria control activation of call path information data collection.

In the current example, thresholds for an active lock within an application are defined in which a left most line is a number of gets, a middle line is a number of slows and a right most line is a slow percent. Each of locks L1 through L4 therefore has three vertical lines associated to indicate each of the respective thresholds.

A top horizontal bar represents slow % threshold 602. The middle horizontal bar represents gets threshold 604. Slows threshold 606 is represented by the bottom horizontal bar.

A first lock, L1 608 has an associated set of three vertical bars or lines. A leftmost vertical line indicates a gets threshold is exceeded. A middle vertical line indicates a slows threshold is exceeded. A rightmost vertical line indicates a slow % threshold is not exceeded.

A second lock, L2 610 also has an associated set of three vertical bars or lines. All three vertical lines of the set indicate no measured threshold is exceeded.

A third lock, L3 612 also has an associated set of three vertical bars or lines. A leftmost vertical line indicates a gets threshold is not exceeded. A middle vertical line indicates a slows threshold is not exceeded. A rightmost vertical line in the set indicates a slow % threshold is exceeded.

A fourth lock, L4 614 also has an associated set of three vertical bars or lines. All three vertical lines are below the respective thresholds and indicate no measured threshold is exceeded.

The corresponding capture of call path information is accordingly enabled for lock L1 608 based on Gets threshold and Slows threshold for lock L1 608 being exceeded and for lock L3 612 based on Slow % threshold being exceeded.

These examples are for illustration only. Establishing and using thresholds is applicable to any lock data collected. A particular threshold of interest, for example, may be a miss % threshold because this metric is typically an indicator of a lock, which is highly contended.

Figure 7:
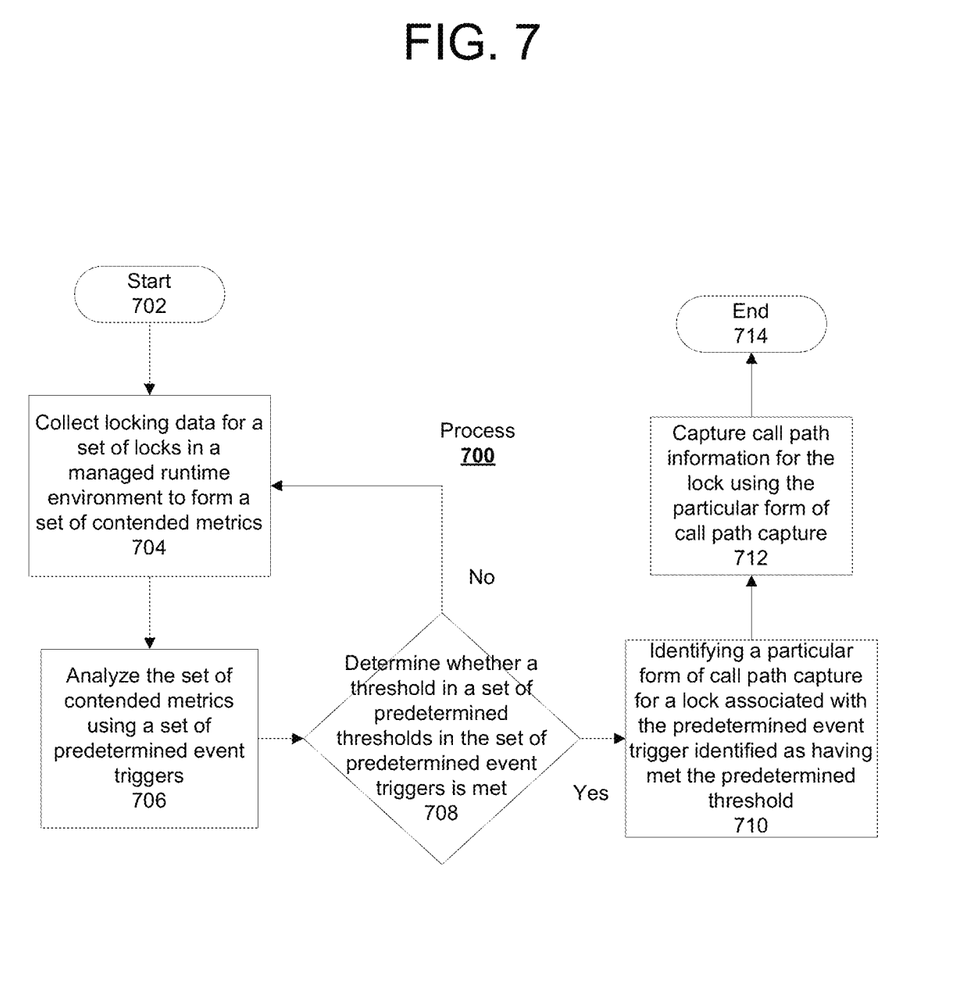
FIG. 7 is a flowchart of a process using the synchronization point identification system of FIG. 3 operable for various embodiments of the disclosure.

With reference to FIG. 7 a flowchart of a process using the synchronization point identification system of FIG. 3 operable for various embodiments of the disclosure is presented. Process 700 provides an example of an embodiment of a process using synchronization point identification system 300 of FIG. 3.

Process 700 begins (step 702) and collects locking data for a set of locks in a managed runtime environment to form a set of contended metrics (step 704). One or more processors of a data processing system perform the actions specified of collecting, analyzing, determining, identifying and capturing. The collected locking data forms a set of data referred to as contended metrics because the information is typically associated with locks in contention from a plurality of threads.

Process 700 analyzes the set of contended metrics using a set of predetermined event triggers (step 706). The set of event triggers comprise one or more predetermined attributes associated with activity data of a respective lock. For example, as previously defined, lock data includes information being collected using monitors including a % miss expressed as 100*SLOW/gets, a number of gets representative of non-recursive lock entries, slow representative of a number of gets which go to an operating system to wait, a % slow representing a percentage of time a thread goes to the operating system to wait, a hold-time representing an average time a lock is held, and a % utilization expressed as 100*Hold-time/Total-time.

Process 700 determines whether a threshold in a set of predetermined thresholds in the set of predetermined event triggers is met (step 708). The determination is based on the analysis performed upon the set of contended metrics for one or more locks in a set of locks. In response to a determination a threshold in a set of predetermined thresholds in the set of predetermined event triggers is not met, process 700 loops back to perform step 704 as before.

In response to a determination a threshold in a set of predetermined thresholds in the set of predetermined event triggers is met, process 700 identifies a particular form of call path capture for a lock associated with the predetermined event trigger identified as having met the predetermined threshold (step 710). Process 700 captures call path information for the one or more locks using the particular form of call path capture (step 712) terminating thereafter (step 714).

Figure 8:
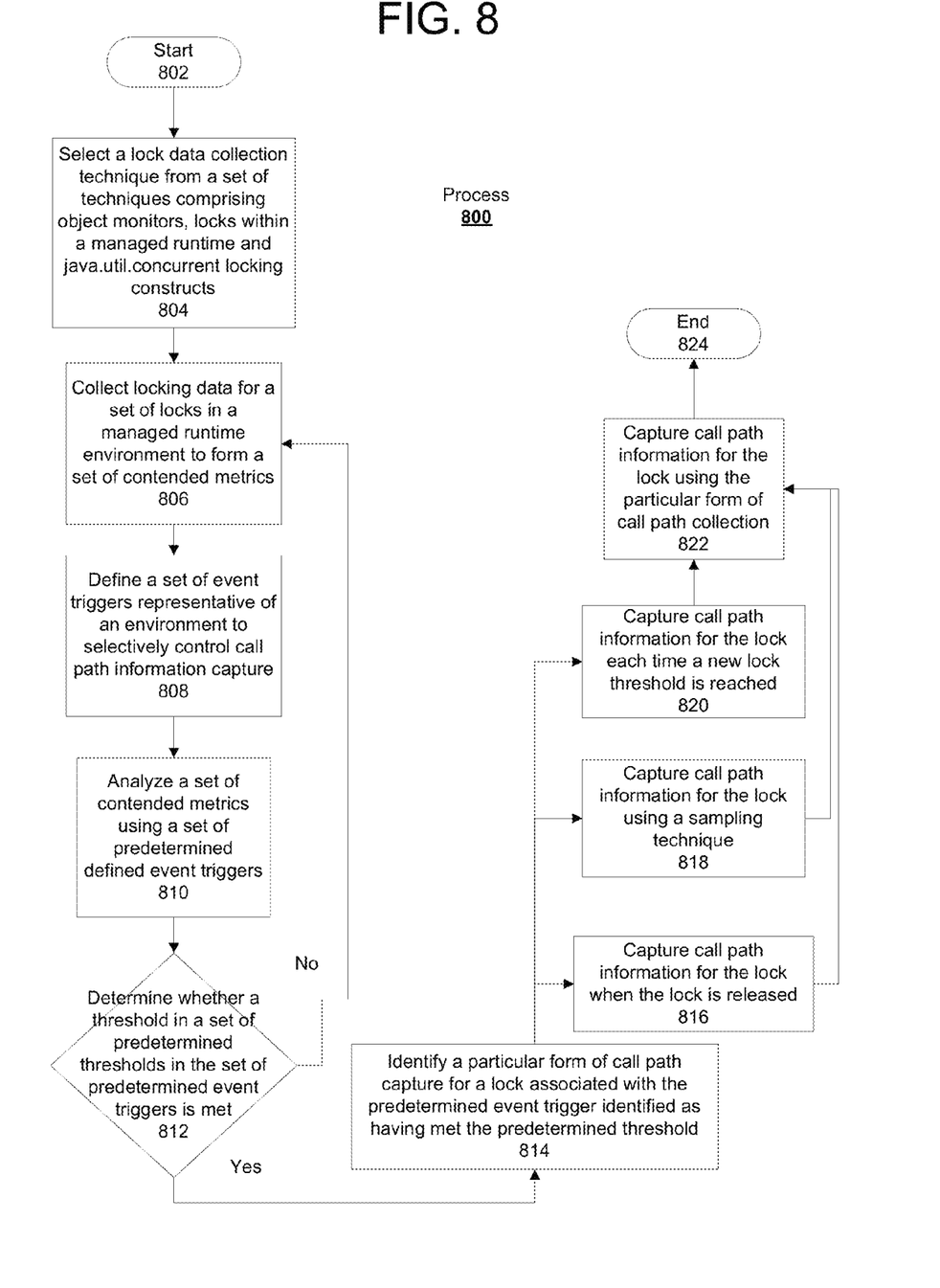
FIG. 8 is a flowchart of a process using the synchronization point identification system of FIG. 3 operable for various embodiments of the disclosure.

With reference to FIG. 8 a flowchart of a process using the synchronization point identification system of FIG. 3 operable for various embodiments of the disclosure is presented. Process 800 provides another example of an embodiment of a process using synchronization point identification system 300 of FIG. 3.

Process 800 begins and selects a lock data collection technique from a set of techniques comprising object monitors, locks within a managed runtime and java.util.concurrent locking constructs (in a JVM environment) (step 804). More than one method of collecting locking data is available in a data processing system or across a number of systems. The method used is not material provided the information is present in a useful form.

Process 800 collects locking data for a set of locks in a managed runtime environment to form a set of contended metrics (step 806). The contended metrics are data representative of the locking activity of interest. The output of the chosen collection mechanism comprises a set of data referred to as contended metrics because the information is typically associated with lock contention activity cause by one or more threads accessing one or more resources defining a pattern which may described access as happening concurrently or sequentially with respect to a particular time interval.

Process 800 defines a set of event triggers representative of an environment to selectively control call path information capture (step 808). An event trigger is specific to a predetermined metric and has an associated threshold value. Upon meeting the threshold value a predetermined action occurs. In the current disclosure meeting a predetermined condition of a threshold for a particular contended metric causes a capture of call path information.

Process 800 analyzes a set of contended metrics using a set of predetermined defined event triggers (step 810). Analysis includes the coalescing of values for a particular set of contended metrics for a particular lock. The collection of data may then be processed in various combinations of contended metrics and associated thresholds to control subsequent processing.

Process 800 determines whether a threshold in a set of predetermined thresholds in the set of predetermined event triggers is met (step 812). The determination is based on the analysis performed upon the set of contended metrics for one or more locks in a set of locks. In response to a determination a threshold in a set of predetermined thresholds in the set of predetermined event triggers is not met, process 800 loops back to perform step 806 as before.

In response to a determination a threshold in a set of predetermined thresholds in the set of predetermined event triggers is met, process 800 identifies a particular form of call path capture for a lock associated with the predetermined event trigger identified as having met the predetermined threshold (step 814).

In response to a determination to capture call path information as per event triggers, the further requirement is to efficiently capture the call path information needed to identify unique call paths and respective relative frequency. Call path information is interesting for both the thread, which requests to acquire a lock, as well as the thread, which was holding the lock at the time of the request. Therefore, in a first scenario call path information is captured for the thread attempting to acquire the lock, because threads may acquire a lock frequently but only hold the lock for a short time. Call path information is also captured in a second scenario for the thread holding the lock when an acquisition of the lock is attempted because although a lock may be acquired infrequently the lock may be held for a long time. In a third scenario call path information is collected for both the first and second scenarios.

In the first scenario the thread marks itself when there is a need to capture data using trigger events thresholds and other checks based on optimizations described when the thread attempts to acquire the lock. In the second scenario the thread marks the lock such that a thread releasing the lock is directed to capture the call stack as part of releasing the lock.

Although straightforward, the capture of full call path information on a thread is costly. Capturing the full call path in each instance, once call path capture has been enabled typically imposes too much overhead and negatively affects application performance characteristics, likely rendering the data collected as invalid. Accordingly one or more of the following techniques are employed to reduce the data collection overhead and enable capturing the required call paths practical.

Process 800 performs one of capture call path information for the lock when the lock is released (step 816), capture call path information for the lock using a sampling technique (step 818) and capture call path information for the lock each time a new lock threshold is reached (step 820). Capture call path information for the lock when the lock is released as in step 816 is a form of deferred capture which postpones the capture of the call path information until after a thread for which capture is initiated no longer holds the lock. This delay or deferment ensures other threads waiting for the same lock are not affected by the capture of the call path information.

Capture call path information for the lock using a sampling technique as in step 818 uses sampling to capture the call path information on a predetermined basis. The sampling reduces the effort required as well as the instances of collection. For example, using sampling to collect or capture the stack 1/N times the lock is acquired rather than every time. Because an acquire/release of locks can often occur regularly choosing a fixed sampling frequency may skew the relative frequency so both a fixed type and an irregular type of sampling is supported. Irregular sampling may be based on pseudo-random numbers or a subset of a sequence like Fibonacci. Given a particular interest in hot locks, over time sampling should capture the call paths and in particular will capture the call paths of most interest, meaning call paths that occur most frequently, first.

In addition to the thresholds for enabling call path capture, setting of additional thresholds, referred to as iterative thresholds, on the information collected for a lock is supported. For example, only performing capturing of call path information after a lock is acquired and after each predetermined number of N slows or N gets. In a further example, sampling may be more time-based rather than counter based so when an event happens more than once in a given time period, the event only counts for 1 against the sample count, and then an action is triggered after N time periods in which an event happens. As with the sampling technique previously described both regular increments and irregular increments are supported to avoid skewing results based on regular patterns in lock usage.

Capture call path information for the lock using a sampling technique as in step 818 uses iterative thresholds which enable leveraging of optimizations already in place for data capture because checks only need to be made when new lock data is collected. Given the interest in hot locks, over time capture of the call paths and in particular capture of the call paths of most interest, which are those that occur most frequently based on a particular threshold, will occur first.

Process 800 captures call path information for the lock using the particular form of call path collection (step 822) with process 800 terminating thereafter. Only one particular capture method is used at a time to capture call path information for a particular lock. However different methods may be used concurrently for different metrics of a same lock.

Thus is presented in an illustrative embodiment a computer-implemented method for identification of code synchronization points. The computer-implemented process comprises collecting, by a processor, locking data for a set of locks in a managed runtime environment associated with the processor to form a set of contended metrics; analyzing the set of contended metrics, by the processor, using a set of predetermined event triggers; determining, by the processor, whether a threshold in a set of predetermined thresholds in the set of predetermined event triggers is met; identifying, by the processor, a particular form of call path capture for a lock associated with the predetermined event trigger identified as having met the predetermined threshold and capturing call path information for the lock using the particular form of call path capture.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for identification of code synchronization points, the computer-implemented process comprising:
   collecting, by a processor, locking data for a set of locks in a managed runtime environment associated with the processor to form a set of contended metrics;
   analyzing the set of contended metrics, by the processor, using a set of predetermined event triggers, wherein the set of predetermined event triggers includes event triggers other than a releasing of a lock in the set of locks;
   determining, by the processor, whether a threshold in the set of predetermined thresholds in the set of predetermined event triggers is met;
   identifying, by the processor, a particular form of call path capture for the lock associated with the predetermined event trigger identified as having met the predetermined threshold; and
   capturing call path information for the lock using the particular form of call path capture, wherein the capturing occurs only after the lock has been released such that an acquiring of the lock by a thread is not delayed by the capturing.

2. The computer-implemented method of claim 1, wherein collecting, by a processor, locking data for a set of locks in a managed runtime environment associated with the processor to form a set of contended metrics further comprises:
   selecting a lock data collection technique from a set of techniques comprising object monitors, locks within the managed runtime and java.util.concurrent locking constructs, wherein a Java environment is used.

3. The computer-implemented method of claim 1 wherein analyzing the set of contended metrics, by the processor, using a set of predetermined event triggers further comprises:
   defining a set of event triggers representative of an environment to selectively control call path information capture.

4. The computer-implemented method of claim 1 wherein identifying, by the processor, a particular form of call path capture for a lock associated with the predetermined event trigger identified as having met the predetermined threshold further comprises:
   selecting the particular form of call path capture from a group comprising capture call path information for the lock when the lock is released, capture call path information for the lock using a sampling technique, and capture call path information for the lock each time a new lock threshold is reached.

5. The computer-implemented method of claim 1 wherein capturing call path information for the lock using the particular form of call path capture further comprises:
   capturing call path information for the lock using a sampling technique to capture the call path information on a predetermined basis, wherein the sampling interval is one of a fixed sampling frequency and an irregular type of sampling wherein the irregular type of sampling is based on one of pseudo-random numbers or a subset of a sequence including a Fibonacci sequence.

6. The computer-implemented method of claim 1 wherein analyzing the set of contended metrics, by the processor, using a set of predetermined event triggers further comprises:
   setting of additional thresholds, referred to as iterative thresholds, on the information collected for a lock.

7. The computer-implemented method of claim 1 wherein capturing call path information for the lock using the particular form of call path capture further comprises:
   in a first scenario, capturing call path information for a thread attempting to acquire the lock, wherein in the first scenario the thread marks itself when there is a need to capture data using trigger events thresholds when the thread attempts to acquire the lock;
   in a second scenario capturing call path information for the thread holding the lock when an acquisition of the lock is attempted, wherein the thread marks the lock such that a thread releasing the lock is directed to capture the call stack as part of releasing the lock; and
   in a third scenario, capturing call path information for both the first scenario and the second scenario.

8. A computer program product for identification of code synchronization points, the computer program product comprising:
   a non-transitory computer recordable-type device containing computer executable program code stored thereon, the computer executable program code comprising:
   computer executable program code for collecting, by a processor, locking data for a set of locks in a managed runtime environment associated with the processor to form a set of contended metrics;
   computer executable program code for analyzing the set of contended metrics, by the processor, using a set of predetermined event triggers, wherein the set of predetermined event triggers includes event triggers other than a releasing of a lock in the set of locks;
   computer executable program code for determining, by the processor, whether a threshold in the set of predetermined thresholds in the set of predetermined event triggers is met;
   computer executable program code for identifying, by the processor, a particular form of call path capture for the lock associated with the predetermined event trigger identified as having met the predetermined threshold; and
   computer executable program code for capturing call path information for the lock using the particular form of call path capture, wherein the capturing occurs only after the lock has been released such that an acquiring of the lock by a thread is not delayed by the capturing.

9. The computer program product of claim 8, wherein computer executable program code for collecting, by a processor, locking data for a set of locks in a managed runtime environment associated with the processor to form a set of contended metrics further comprises:
   computer executable program code for selecting a lock data collection technique from a set of techniques comprising object monitors, locks within the managed runtime and java.util.concurrent locking constructs, wherein a Java environment is used.

10. The computer program product of claim 8 wherein computer executable program code for analyzing the set of contended metrics, by the processor, using a set of predetermined event triggers further comprises:
    computer executable program code for defining a set of event triggers representative of an environment to selectively control call path information capture.

11. The computer program product of claim 8 wherein computer executable program code for identifying, by the processor, a particular form of call path capture for a lock associated with the predetermined event trigger identified as having met the predetermined threshold further comprises:

computer executable program code for selecting the particular form of call path capture from a group comprising capture call path information for the lock when the lock is released, capture call path information for the lock using a sampling technique, and capture call path information for the lock each time a new lock threshold is reached.

12. The computer program product of claim 8 wherein computer executable program code for capturing call path information for the lock using the particular form of call path capture further comprises:
   computer executable program code for capturing call path information for the lock using a sampling technique to capture the call path information on a predetermined basis, wherein the sampling interval is one of a fixed sampling frequency and an irregular type of sampling wherein the irregular type of sampling is based on one of pseudo-random numbers or a subset of a sequence including a Fibonacci sequence.

13. A computer program product of claim 8 wherein computer executable program code for analyzing the set of contended metrics, by the processor, using a set of predetermined event triggers further comprises:
   computer executable program code for setting of additional thresholds, referred to as iterative thresholds, on the information collected for a lock.

14. A computer program product of claim 8 wherein computer executable program code for capturing call path information for the lock using the particular form of call path capture further comprises:
   in a first scenario, computer executable program code for capturing call path information for a thread attempting to acquire the lock, wherein in the first scenario the thread marks itself when there is a need to capture data using trigger events thresholds when the thread attempts to acquire the lock;
   in a second scenario, computer executable program code for capturing call path information for the thread holding the lock when an acquisition of the lock is attempted, wherein the thread marks the lock such that a thread releasing the lock is directed to capture the call stack as part of releasing the lock; and
   in a third scenario, computer executable program code for capturing call path information for both the first scenario and the second scenario.

15. An apparatus for identification of code synchronization points, the apparatus comprising:
   a communications fabric;
   a memory connected to the communications fabric, wherein the memory contains computer executable program code;
   a communications unit connected to the communications fabric;
   an input/output unit connected to the communications fabric;
   a display connected to the communications fabric; and
   a processor unit connected to the communications fabric, wherein the processor unit executes the computer executable program code to direct the apparatus to:
   collect locking data for a set of locks in a managed runtime environment associated with the processor to form a set of contended metrics;
   analyze the set of contended metrics using a set of predetermined event triggers, wherein the set of predetermined event triggers includes event triggers other than a releasing of a lock in the set of locks;
   determine whether a threshold in the set of predetermined thresholds in the set of predetermined event triggers is met;
   identify a particular form of call path capture for the lock associated with the predetermined event trigger identified as having met the predetermined threshold; and
   capture call path information for the lock using the particular form of call path capture, wherein the capturing occurs only after the lock has been released such that an acquiring of the lock by a thread is not delayed by the capturing.

16. The apparatus of claim 15, wherein the processor unit executes the computer executable program code to collect locking data for a set of locks in a managed runtime environment associated with the processor to form a set of contended metrics further directs the apparatus to:
   select a lock data collection technique from a set of techniques comprising object monitors, locks within the managed runtime and java.util.concurrent locking constructs, wherein a Java environment is used.

17. The apparatus of claim 15 wherein the processor unit executes the computer executable program code to analyze the set of contended metrics using a set of predetermined event triggers further directs the apparatus to:
   define a set of event triggers representative of an environment to selectively control call path information capture.

18. The apparatus of claim 15 wherein the processor unit executes the computer executable program code to identify a particular form of call path capture for a lock associated with the predetermined event trigger identified as having met the predetermined threshold further directs the apparatus to:
   select the particular form of call path capture from a group comprising capture call path information for the lock when the lock is released, capture call path information for the lock using a sampling technique, and capture call path information for the lock each time a new lock threshold is reached.

19. The apparatus of claim 15 wherein the processor unit executes the computer executable program code to capture call path information for the lock using the particular form of call path capture further directs the apparatus to:
   capture call path information for the lock using a sampling technique to capture the call path information on a predetermined basis, wherein the sampling interval is one of a fixed sampling frequency and an irregular type of sampling wherein the irregular type of sampling is based on one of pseudo-random numbers or a subset of a sequence including a Fibonacci sequence.

20. The apparatus of claim 15 wherein the processor unit executes the computer executable program code to capture call path information for the lock using the particular form of call path capture further directs the apparatus to:
   in a first scenario, capture call path information for a thread attempting to acquire the lock, wherein in the first scenario the thread marks itself when there is a need to capture data using trigger events thresholds when the thread attempts to acquire the lock;
   in a second scenario capture call path information for the thread holding the lock when an acquisition of the lock is attempted, wherein the thread marks the lock such that a thread releasing the lock is directed to capture the call stack as part of releasing the lock; and
   in a third scenario, capture call path information for both the first scenario and the second scenario.

21. The apparatus of claim 15 wherein the processor unit executes the computer executable program code to analyze the set of contended metrics using a set of predetermined event triggers further directs the apparatus to:
  set additional thresholds, referred to as iterative thresholds, on the information collected for a lock.

* * * * *